US006124941A

United States Patent [19]

Bothner et al.

[11] Patent Number: 6,124,941

[45] Date of Patent: *Sep. 26, 2000

[54] METHOD AND APPARATUS FOR PREPARING, ON DEMAND, A SELECTED INFORMATION PACKAGE, INCLUDING DIGITAL AND PRINT MEDIA, FROM A CATALOG OF INFORMATION PACKAGES

[75] Inventors: Carl Raymond Bothner, Rochester; William James Mueller, Henrietta, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,541

[22] PCT Filed: Jun. 14, 1996

[86] PCT No.: PCT/US96/10421

§ 371 Date: Feb. 28, 1997

§ 102(e) Date: Feb. 28, 1997

[87] PCT Pub. No.: WO97/01843

PCT Pub. Date: Jan. 16, 1997

Related U.S. Application Data

[60] Provisional application No. 60/000,641, Jun. 29, 1995.

[51] Int. Cl.[7] .......... G06K 15/00

[52] U.S. Cl. .......... 358/1.16; 358/1.18

[58] Field of Search .......... 395/115, 101, 395/106, 111, 114; 156/384; 400/70, 73; 36/15, 84, 85, 86, 34; 358/1.16, 1.1, 1.6, 1.12, 1.18

[56] References Cited

U.S. PATENT DOCUMENTS 4,910,675 3/1990 Burns et al. .......... 364/478
4,949,257 8/1990 Orbach .......... 364/401
5,317,337 5/1994 Ewaldt .......... 347/2
5,427,029 6/1995 Dumke .......... 101/484
5,518,325 5/1996 Kahle .......... 400/70
5,592,596 1/1997 Balsom .......... 395/117
5,769,269 6/1998 Peters .......... 221/7
5,844,593 12/1998 Proffitt et al. .......... 347/262

FOREIGN PATENT DOCUMENTS 0 017 700 10/1980 European Pat. Off. .......... G11B 23/40
2200493 8/1988 United Kingdom .......... G11B 5/86
2259685 3/1993 United Kingdom .......... B65B 25/00

*Primary Examiner*—Arthur G. Evans
*Attorney, Agent, or Firm*—Raymond L. Owens

[57] ABSTRACT

Methods and apparatus for preparing, on user demand, a selection from a catalog of information packages. The information package selection includes digital media bearing a digitized first body of information and print media bearing a printed second body of information. In the method, the catalog of information packages is displayed. A user takes an action that generates an input signal corresponding to the information package selection. The input signal is received and a digital file group for the information package selection is provided. The digital file group includes information necessary to write the first body of information to digital media and information necessary to print the second body of information to print media. An identification marking is allocated to the digital file group. Digital media and print media are allocated to the digital file group. The first body of information and a digital representation of the identification marking are written to the digital media. The identification marking is printed on the print media. The second body of information is printed on the print media. The media bearing the identification marking are sorted together.

7 Claims, 10 Drawing Sheets

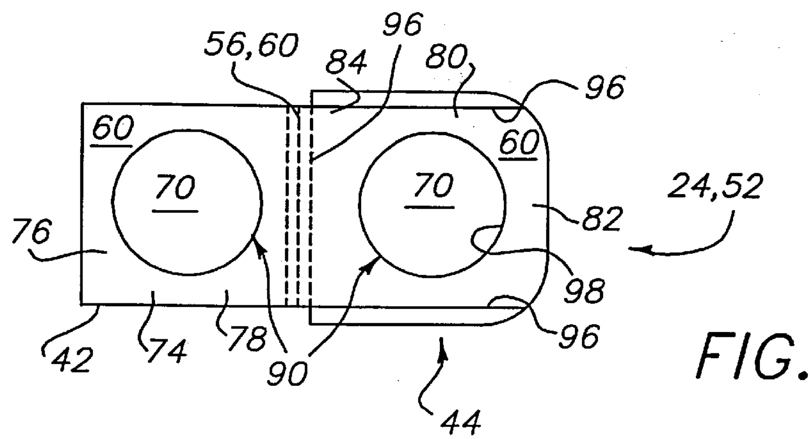
FIG. 11
FIG. 12a
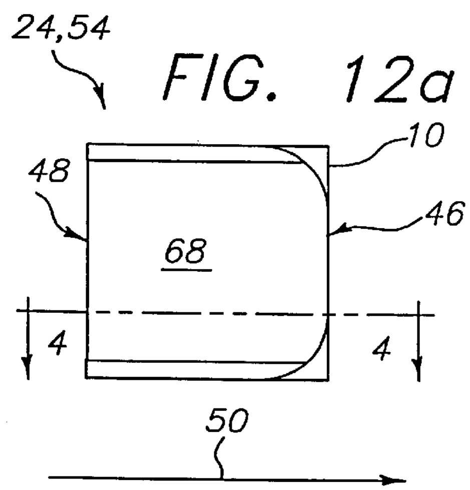
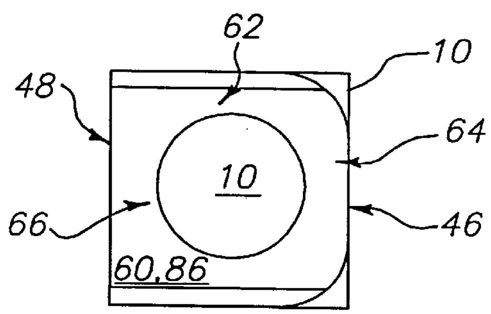
FIG. 12b
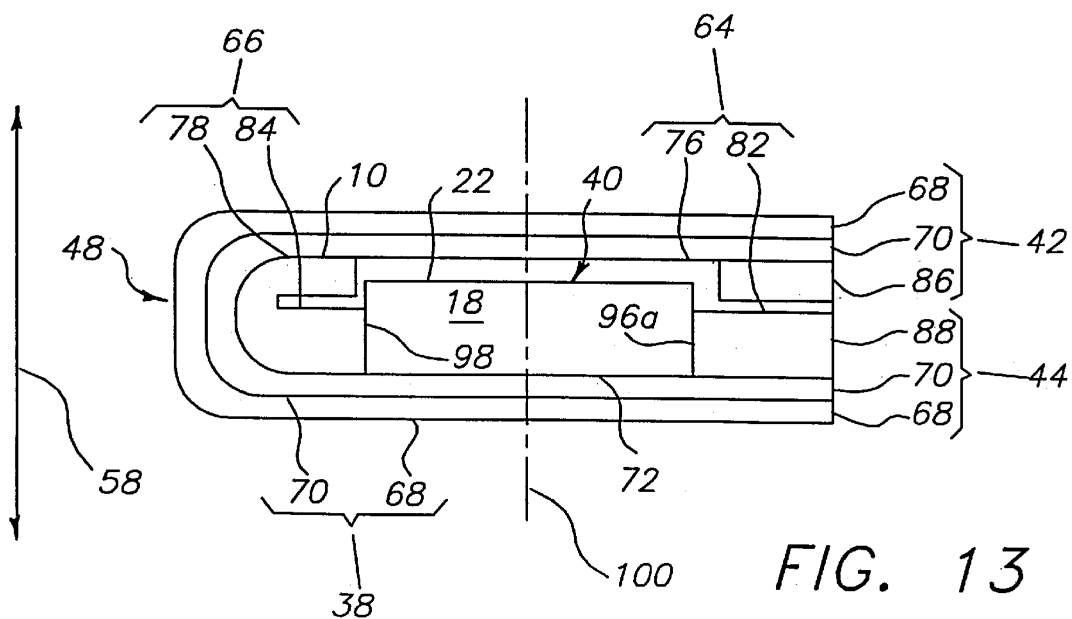
FIG. 13

METHOD AND APPARATUS FOR PREPARING, ON DEMAND, A SELECTED INFORMATION PACKAGE, INCLUDING DIGITAL AND PRINT MEDIA, FROM A CATALOG OF INFORMATION PACKAGES

CROSS REFERENCE TO RELATED APPLICATIONS

This application is a continued prosecution application of U.S. Ser. No. 08/793,541 filed Feb. 28, 1997, which claimed the priority of PCT Application No. PCT/US/96/10421 filed Jun. 14, 1996 and U.S. Provisional application Ser. No. 60/000,641 filed Jun. 29, 1995.

FIELD OF THE INVENTION

The invention relates to writable digital information media and methods and apparatus for preparing and packaging such media. The invention more particularly relates to a method and apparatus for preparing, on user demand, a selected information package, including digital media bearing a digitized first body of information and print media bearing a printed second body of information, from a catalog of information packages.

BACKGROUND OF THE INVENTION

Optical storage media, and particularly the optical disc, is finding increasing use in the high density storage of digital information, such as digitized music, digitized photographs, games, video, and computer programs. At present, three principal types of optical storage media are in common use.

The first type, referred to as a CD or ROM (read only memory) disc, is manufactured by pressing depressions into a substrate, in a manner analogous to the manufacture of phonograph records. This type of optical disc has shortcomings similar to those of phonograph records. Prepared recordings must be warehoused until needed and small production runs are subject to an economic disincentive. This type of optical storage disc is very often marketed in a plastic storage box, commonly referred to as a "jewel box". A jewel box, typically has a transparent base that includes a folded sheet of informational printed media, covered by an insert (commonly opaque) that grips the optical disc. A transparent cover is hinged to the base. A booklet having one or more sheets of folded printed media is commonly held by the cover. For convenience, the term "information package" is used herein to refer to the information included for the user, in an optical disc of whatever type, along with the information printed on the accompanying printed media.

A second type of optical storage media, commonly referred to as a writable optical storage disc, has the capability of having information recorded (written) thereon at some time after fabrication of the medium. A third type can also have information added after fabrication, but that information can be erased or modified at a later time. The latter two types of optical storage media lend themselves to small production runs and "on demand" preparation. A shortcoming of writable and erasable optical discs is that the writing process is relatively slow in comparison to processes that can be used to prepare printed media.

The ease of preparation of writable and erasable optical storage discs in combination with an elimination of physical storage requirements, suggests their use as a replacement for ROM discs. Security needs, however, argue against this use. U.S. Pat. No. 5,317,337 teaches the provision of individual markings on CD-ROM discs by use of ink jet printing. An alternative approach is the use of the method disclosed in U.S. Pat. No. 5,489,768 and U.S. Pat. No. 5,430,28. These documents teach the use of an optical disc bearing an identifying marking, such as an optical bar code, in combination with the inclusion of a digital file structure on the disc representing an identification number relatable to the identifying marking. This optical bar code can be embedded into the disc and then covered with a layer of clear protective lacquer or the like.

It would thus be desirable to provide an apparatus and method for preparing information packages on demand from a catalog of information packages.

SUMMARY OF THE INVENTION

The invention provides methods and apparatus for preparing, on user demand, a selection from a catalog of information packages. The information package selection includes digital media bearing a digitized first body of information and print media bearing a printed second body of information. In the method, the catalog of information packages is displayed. A user takes an action that generates an input signal corresponding to the information package selection. The input signal is received and a digital file group for the information package selection is provided. The digital file group includes information necessary to write the first body of information to digital media and information necessary to print the second body of information to print media. An identification marking is allocated to the digital file group. Digital media and print media are allocated to the digital file group. The first body of information and a digital representation of the identification marking are written to the digital media. The identification marking is printed on the print media. The second body of information is printed on the print media. The media bearing the identification marking are sorted together.

It is an advantageous effect of the invention that apparatus and method are provided that permit the secure use of writable or erasable optical discs to provide information packages on demand from a catalog of information packages. It is a further advantageous effect of the invention that this apparatus and method will reduce the physical storage requirements for sellers of written digital discs.

BRIEF DESCRIPTION OF THE FIGURES

The invention itself will be better understood by reference to the following description of an embodiment of the invention taken in conjunction with the accompanying figures wherein:

FIG. 11 is a top plan view of a lamination jacket useful in the fusing procedure of FIG. 10. The lamination jacket is illustrated in an open configuration. The hinge is indicated by dashed lines.

FIG. 12*a* is a top plan view of the lamination jacket of FIG. 11 in a closed configuration and filled with a transfer support and digital disc.

FIG. 12*b* is the same view as in FIG. 12*a,* except that the shell of the lamination jacket is removed.

FIG. 13 is a cross-sectional view of the filled jacket of FIGS. 12*a*–12*b* taken substantially along line 4—4.

DETAILED DESCRIPTION OF THE INVENTION

Figure 1:
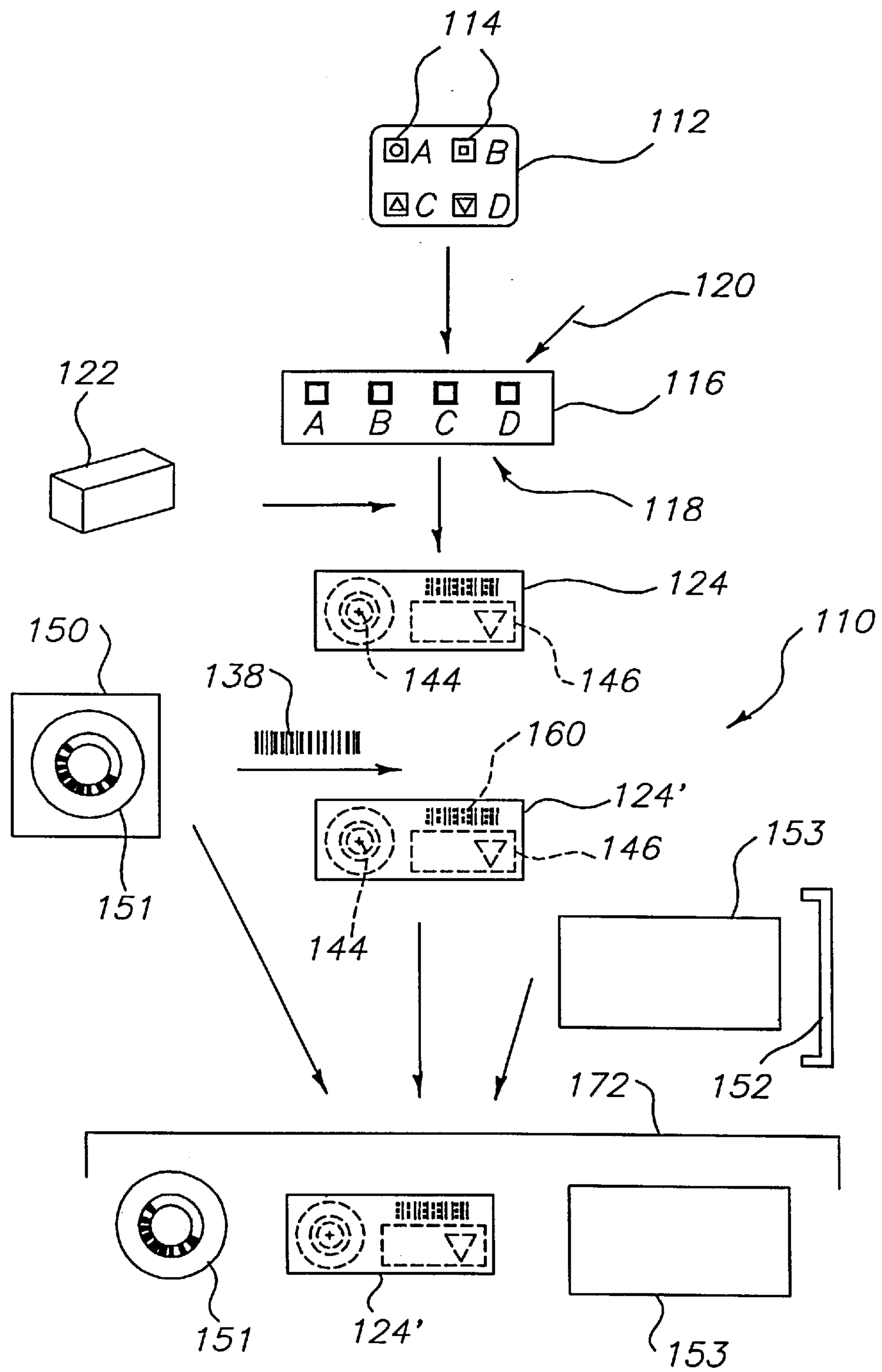
FIGS. 1 and 2*a* are a diagrammatical view of an embodiment of the method and apparatus of the invention.

The method of the invention produces, on demand, a multiple component information package including digital media bearing a digitized first body of information and print media bearing a printed second body of information. The device used to impart information in digital form to digital media is referred to herein as a "writer". The device used to impart information in printed form to print media is referred to herein as a "printer". Suitable digital media includes ROM, write once, and erasable optical discs, magnetic "floppy" discs, tape cassettes, and flash memory cards. Selection of print media is largely a matter of convenience. In a preferred embodiment of the invention, the digital media is a writable compact disc and the printed media is literature for inclusion with the writable compact disc in a jewel box.

Both the method and apparatus of the invention are represented in diagrammatical form in FIGS. 1–17. The following discussion will refer predominantly to the apparatus, however, the features of the method of the invention will also be readily apparent from this discussion.

The apparatus 110 of the invention has a display 112 that shows indicia 114 identifying individual information packages of a catalog of information packages. The indicia 114 are sufficient for a user to select a desired information package; beyond that, the characteristics of the display 112 may vary widely. For example, the display 112 can be a video monitor that provides an interactive list or array of summary information, with more detailed information available in response to user input. Alternatively, the display 112 can be as simple as a summary or detailed static display, in the form of a card or poster or the like, or a verbal menu provided over a phone line.

A signal generator 116, including a user input panel 118, is disposed in operative relation to the display 112, so that the user can input a demand for a selected information package (symbolized by arrow 120). The user input is converted by the signal generator into a signal (not shown) identifying the information package selection. The signal generator 116 and input panel 118 can take a wide variety of forms; for example, a standard or simplified computer keyboard, touch display panel, or voice recognition system.

The apparatus 110 of the invention includes a file store 122 which provides digitized file groups for the information package selections. The term "file group" is used herein to refer to both individual computer files and groups of files having a common or collective function. It is currently preferred that the file store 122 include a package file group 124 for each of the information packages in the displayed catalog. A representation of the package file group 124 for a particular embodiment of the invention is presented in FIG. 3. The package file group 124 includes an operational file group 126, a digital media file group 128, and a print media file group 130. The operational file group 126 includes the access and distribution control file group 132 and the identification marking file group 134. The access and distribution control file group 132 provides functions related to initialization or preparation and distribution of appropriate file groups to the writer and printer. The two media file groups 128,130 each include a code/format file group 136, 138, a directory file group 140,142 and a data file group 144,146. The code/format file group 136,138 includes information necessary to configure the writer to recognize the respective data file group 144 or 146, while the directory file group 140,142 identifies individual files within the respective data file group 144 or 146. The package file group is symbolized by a box bearing a dashed representation of a digital disc for data file group 144 and a dashed representation of a printed sheet for data file group 146.

The file store 122 can be any of a wide variety of digital storage media, for example a conventional hard disc, a RAID hard disc storage system, or a multiple disc "juke box" of erasable optical discs. The file store 122 in combination with the display 112 and signal generator 116 can comprise an appropriately configured microcomputer.

The file store 122 may represent a permanent storehouse for the package file groups 124 of the information packages in the catalog, or can be a temporary buffer that is downloaded with a digital file group for a selected information package in response to user demand. In the latter case, all of the digital file groups can be stored in a "main storehouse", a mainframe computer or the like. Another alternative is an intermediate position in which some digital file groups are present in the file store and other groups are retained on a main storehouse until requested by the apparatus of the invention in response to user demand.

It is preferred that the catalog of available information packages be subject to updating. This can be provided in a variety of ways. For example, the file store can include means for communicating with the main storehouse for regular or intermittent updating of package file groups. A telecommunications link to the main storehouse is considered most convenient, however, communication could be provided, for example, by physical transmission of digital media. For example, the media used in the file store could be physically replaced to update the catalog of available information packages.

Figure 2A:
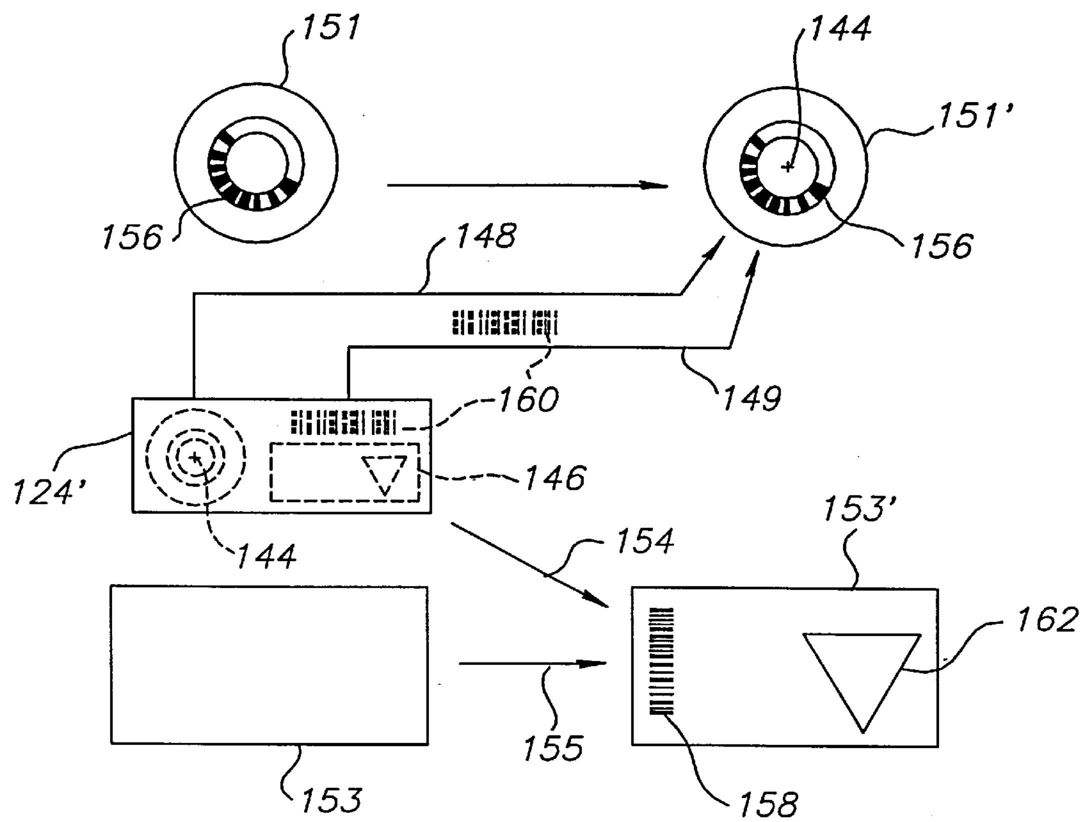

The apparatus 110 of the invention includes a digital writer (symbolized by arrows 148,149 in FIG. 2) for writing the first body of information on the digital media (The written digital media 151' is identified in FIG. 2*a* by a "+" representing the digital media data file group 144.) Devices for writing digital information on digital media are well known to those skilled in the art. For example, a suitable digital writer for a writable optical disc is the Kodak™ PCD 600 CD Writer marketed by Eastman Kodak Company of Rochester, N.Y.

The apparatus 110 of the invention includes a store 150 of digital media 151 and a store 152 of print media 153. The media 151,153 are supplied from the stores 150,152 to the writer and printer. In a particular embodiment of the invention, the digital media is a writable optical disc.

The apparatus 110 of the invention includes a sheet media printer (symbolized by arrows 154,155 in FIG. 2) for printing the second body of information as a printed image 162 on the print media (identified in printed form as 153'). A wide range of suitable printers are suitable including impact printers, ink jet printers, thermal dye printers, and electrophotographic printers.

A wide range of print media can be used. The selection of print media is dependent upon the characteristics of a desired product and the requirements of the printer. In preferred embodiments of the invention, the print media includes the face of a digital disc. In these embodiments, the sheet media printer may be a single device or may include two or more discrete devices. For example, the sheet media printer could include both a conventional ink jet or electrophotographic printer and second ink jet printer.

Figure 4:
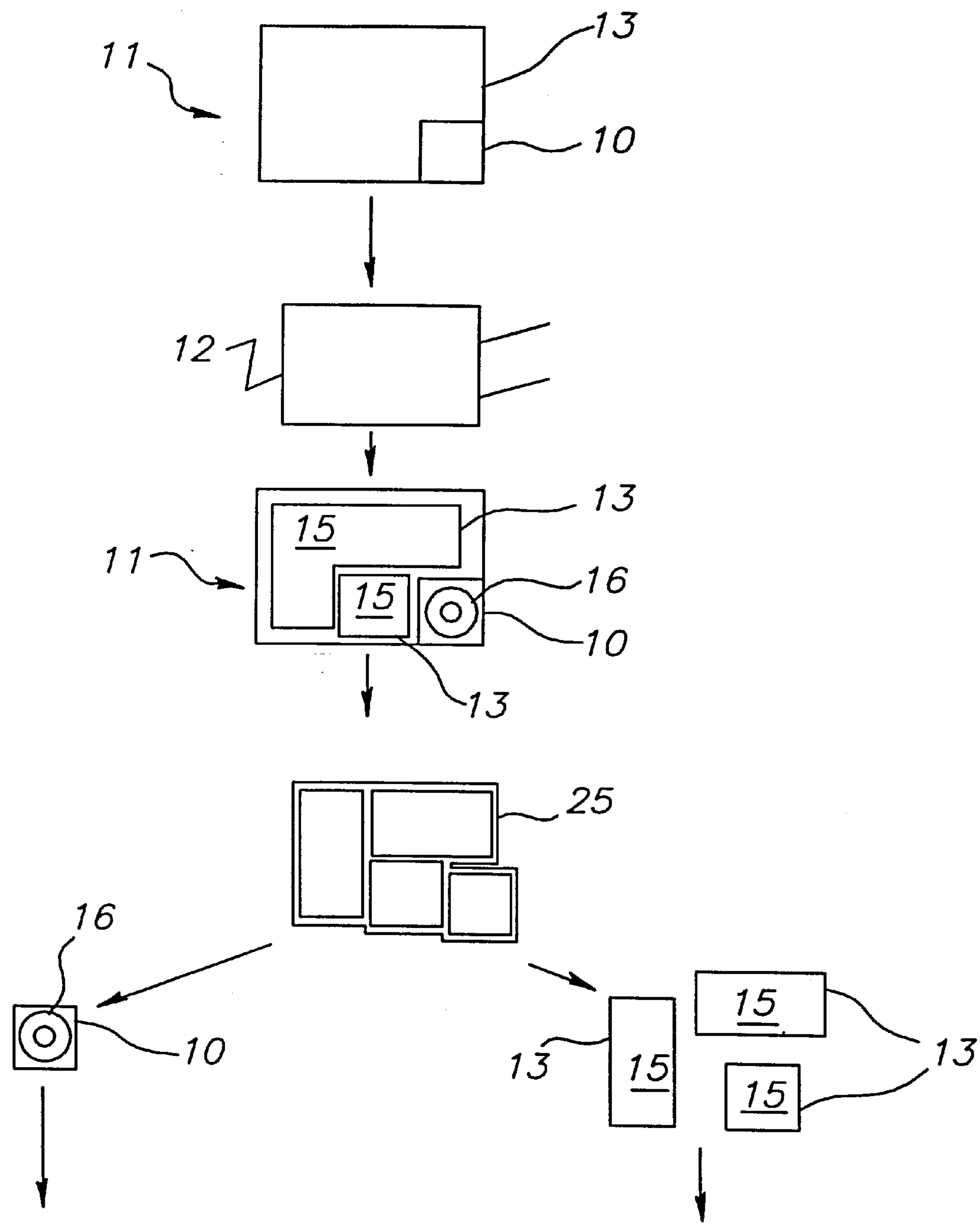
FIG. 4 is a diagrammatical view of part I of printing procedures of the method of FIGS. 1–2.
Figure 6:
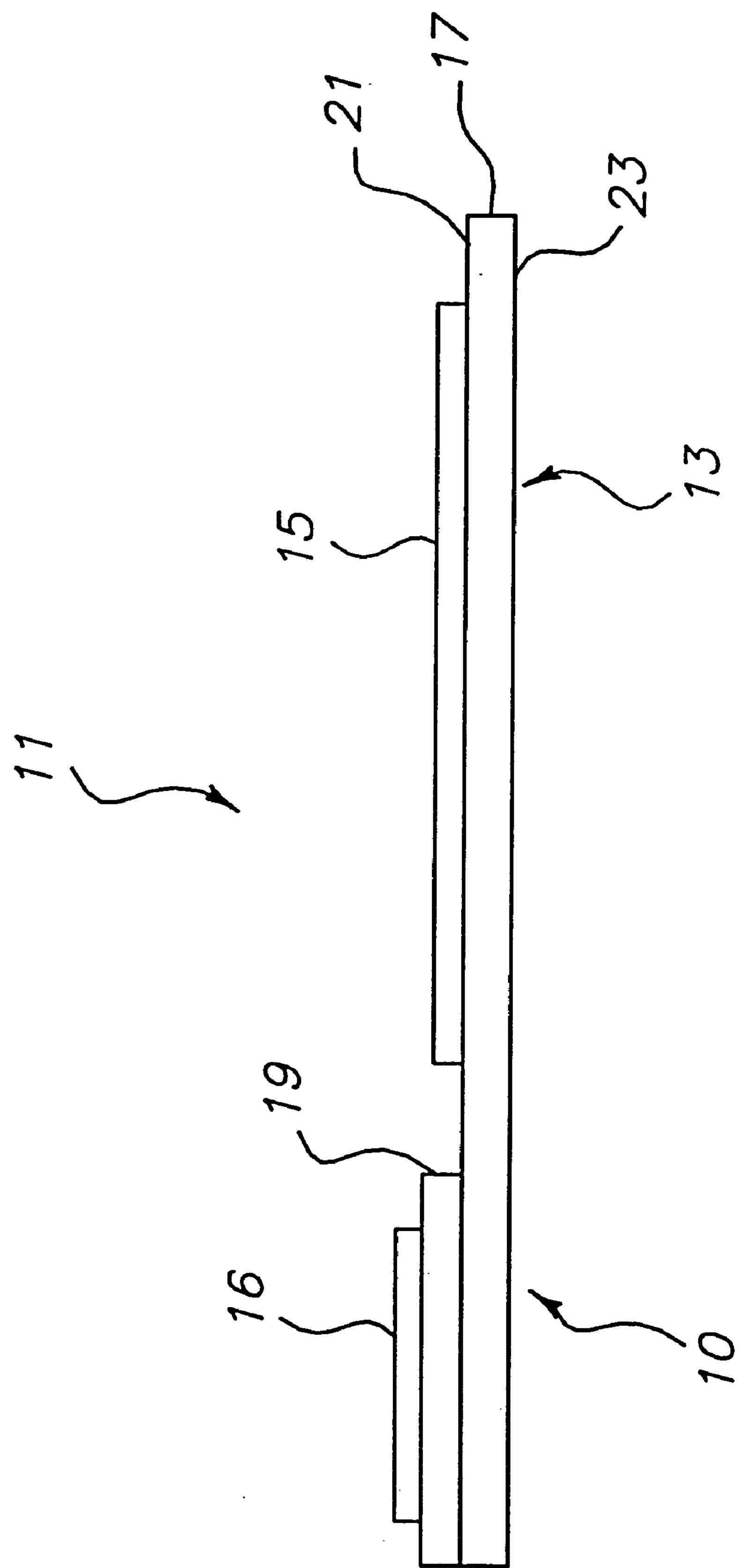
FIG. 6 is a diagrammatical cross-sectional view of a partial transfer sheet useful in the methods of the invention.
Figure 7:
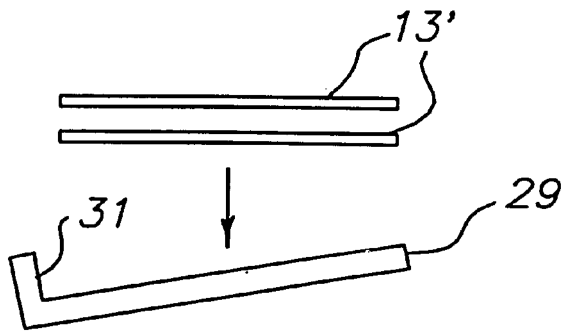
FIG. 7 is a diagrammatical view of an optional collating and organizing step of the procedures of FIGS. 4–5.

In a currently preferred embodiment of the invention, the printer electrophotographically prints a toner image onto a sheet of print media 11 referred to herein as a "partial transfer sheet". Referring now to FIGS. 4 and 6, the partial transfer sheet 11 has a literature portion 13 and a transfer portion 10. The toner image fuses with the partial transfer sheet 11 in the literature portion 13 to provide what is referred to herein as a "fused toner image 15". In the transfer portion 10 of the sheet 11, the toner image is "unfused" and is described herein as being a "transferable toner image 16" or a "transferable image 16". The term "unfused" is slight misnomer. In an electrophotographic printer, a toner image is initially formed of discrete particles of toner which are then fused to each other and to a receiver. In the transfer portion 10 of the partial transfer sheet 11, toner particles forming the transferable image 16 are fused to each other. There is sufficient adherence of the transferable toner image 16 to the transfer portion 10 so as to prevent significant offset, that is, retention of a portion of toner image on the fusing system of the printer. The transferable toner image 16 is not so adhered to the transfer portion 10 that it will not transfer to a digital disc or similar electrophotographic receiver placed in contact with the transferable toner image 16 under conditions substantially the same as those in the fusing system of the electrophotographic printer 12.

The partial transfer sheet 11 has a support or support layer 17 and a transfer layer 19. The support 17 is a substantially planar electrophotographic receiver, that is, a sheet of copy paper or transparency material or other sheet material which can receive an electrophotographic toner image and to which the electrophotographic toner image can be permanently fused. The support 17 can be uniform in composition or can have a multilayer structure.

The transfer layer 19 is a low surface energy material that has an adhesive strength, relative to the transferable toner image, that is within a selected range that allows the support to retain and then release the transferable toner image. This adhesive strength is expressed herein as a peel force, (peel forces herein are measured at 90°). The support has a surface energy that is insufficient to retain a transferable toner image subject to a peel force of greater than 550 Newtons/meter.

Suitable materials for the transfer layer include alkyl fluorophosphonates and certain amorphous perfluorocarbons. The alkyl fluorophosphonates have the general structure:

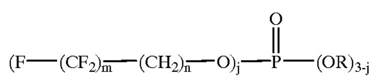

where j is 1 or 2; m is from 3 to 8; n is from 1 to 6; and R is selected from the group consisting of $NH_4$ and H. One example of a commercially available alkyl fluorophosphonate is identified by the general structure:

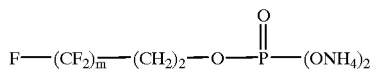

where m is from 3 to 8. This material is available from E.I. du Pont de Nemours and Co. of Wilmington, Del., under the designation: "Zonyl™ FSE". Zonyl™ FSE has a surface energy of from 16 to 20 dynes/cm. Another commercially available alkyl fluorophosphonate is identified by the general structure:

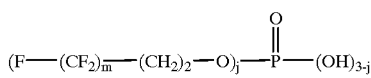

where m is from 3 to 8 and j is 1 or 2. This material is available from E.I. du Pont de Nemours and Co. under the designation: "Zonyl™UR". Zonyl™ UR has a surface energy of from 16 to 20 dynes/cm.

The amorphous perfluorocarbons have the general structure:

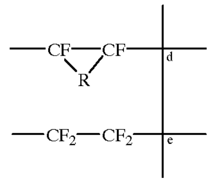

where R represents the atoms and electrons necessary to complete a perfluoro ring having a total of 5 carbons and heteroatoms, and d and e are mole fractions having a sum of 1. Some specific examples of a commercially available amorphous perfluorocarbons are identified by the general structure:

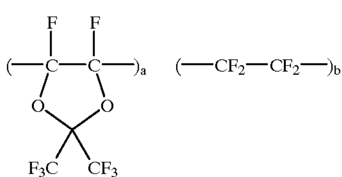

where a and b are mole fractions having the sum of 1. An amorphous perfluorocarbon having this structure where a=0.65 and b=0.35 is available from E.I. du Pont de Nemours and Co under the designation: "Teflon™ AF 1600. Another amorphous perfluorocarbon having this structure where a=80 and b=20 is available from E.I. du Pont de Nemours and Co under the designation: "Teflon AF 2400". Teflon™ AF 1600 and Teflon™ AF 2400 are aqueous or non-aqueous copolymerization products of tetrafluoroethene and 2,2-bis(trifluoromethyl)-4,5-difluoro-1,3-dioxolane.

The glass transition temperature ($T_g$) of Teflon™ AF materials is a function of the relative mole fractions of a and b. Teflon™ AF 1600 has a $T_g$ of 160° C. Teflon™ AF 2400 has a $T_g$ of 240° C. Suitable $T_g$'s for the material of the transfer surface 14 are in the range of 35° C. to 300° C.

The transfer layer is not limited to a particular thickness, however, it is desirable that the transfer layer be thin so as to minimize usage of the low surface energy material. Since excessive surface roughness of the transfer layer tends to cause areas of the toner image to be retained on the transfer layer after fusing of the transferable toner image, the transfer layer should be sufficiently smooth to ensure substantially complete transfer of the toner image to the digital disc. For a thin transfer layer, surface roughness reflects the roughness of the underlying support, thus, a smooth support should be used.

A thin, smooth transfer layer can be conveniently provided by gravure coating or stamp coating a 0.5 to 2.0 micrometer thick layer of the low surface energy material onto a sheet of high quality graphic arts paper or laser printer paper. For example, the support layer can be a sheet of high-clay, acid-sized paper having a Sheffield smoothness of from 120±40 to 160±40. Specific examples of suitable papers are "Spectratech Laser Gloss™" electrophotographic paper, marketed by Scott Paper Company, of Boston, Mass., and "Vintage Velvet™" graphic arts paper, marketed by Potlatch corp., of San Francisco, Calif. The support layer is not limited to paper, but can be transparency material or other material suitable for use as an electrophotographic receiver, that is adequately smooth and meets other requirements of a particular use.

The transfer layer 19 is substantially free of "bare spots" or other artifacts which would cause ferrotyping. The partial transfer sheet 11 has an upper or receiving surface 21 and a lower surface 23. The transfer layer 19 is united with the receiving surface 21 of the partial transfer sheet 11. The transfer layer 19 overlies the transfer portion 10 of the partial transfer sheet 11. The literature portion 13 of the partial transfer sheet 11 lacks the transfer layer 19. The relative sizes of the literature and transfer portions 13,10 are determined by the uses of the respective portions in labeling the digital disc and providing the accompanying literature. As a result, the literature portion 13 has a total area exceeding the area of the transfer portion 10. The literature portion 13 can be printed on only the upper surface 21 or can be printed on both surfaces 21,23 using a printer having a duplexing capability.

The partial transfer sheet 11 can include a visible indicator (not shown) on the receiving surface 21 to aid an operator in properly orienting the sheets 11 in the paper supply of the printer 12. The visible indicator can be located in a "waste" section of the literature or transfer portion 13,10.

The toner image is printed on the partial transfer sheet 11 using a conventional electrophotographic printer or copier. A preferred electrophotographic printer for use in the method of the invention is a Kodak ColorEdge Printer™, Model 1550+, marketed by Eastman Kodak Company of Rochester, N.Y.

The image is printed onto the partial transfer sheet 11 in a normal orientation on the literature portion 13 and in a mirror image orientation on the transfer portion 10. The literature and transfer portions 13,10 can both include information subject to electrophotographic printing, such as color pictorial images, text, and magnetically readable characters. The transferable image 16 may be opaque or semi-transparent. If the color pictorial images are semi-transparent, then it may be desirable to adjust the color balance of the literature and transfer portions 13,10 to accomodate color differences due to the underlying support material, paper or other electrophotographic receiver in the case of the literature portion 13 and the face of the digital disc in the case of the transfer portion 10. Such adjustments of color balance can be conveniently provided by digital manipulation of the image by methods well known to those skilled in the art or, for particular embodiments of the invention, by a method disclosed in a U.S. Patent Application, entitled: "COMPOSITE SHEET AND METHODS FOR PRINTING DIFFERENTLY-TRANSFORMED IMAGES USING COMPOSITE SHEET", filed concurrently herewith, by Eric Zeise (which is hereby incorporated herein by reference). Color balance could also be addressed by the use of white ink or white toner to modify the coloration of all or part of the face of the digital disc.

Image information required by the printer can be supplied in a variety of ways well known to those skilled in the art. Information can be supplied from a hard or floppy disc in a microcomputer. Information can be supplied by a scanner, or the equivalent portion of a copier. Information can be supplied from a remote source via a computer interface.

After printing, the literature and transfer portions 13,10 of the partial transfer sheet 11 are separated. It is preferred that the literature and transfer portions 13,10 be cut from the partial transfer sheet 11; however, other separation means known to those skilled in the art could be used. For example, perforated tear-lines or the like could be provided in the partial transfer sheet 11. The separation can be performed in a single operation or a sequence of steps. The literature portion 13 can be divided into one or more pieces of appropriate shape, and waste, can also be removed from one or both portions. The partial transfer sheet 11 can be cut apart by any of a wide variety of separation devices. For example, the partial transfer sheet 11 can be cut in a single step using an appropriately configured punch. (A separation device is indicated diagrammatically in FIG. 4 by a punch 25.) The sheet 11 can be sliced during movement relative to rotary cutters or stationary knives. Although it is inefficient, the sheet 11 can be cut by hand.

Figure 5:
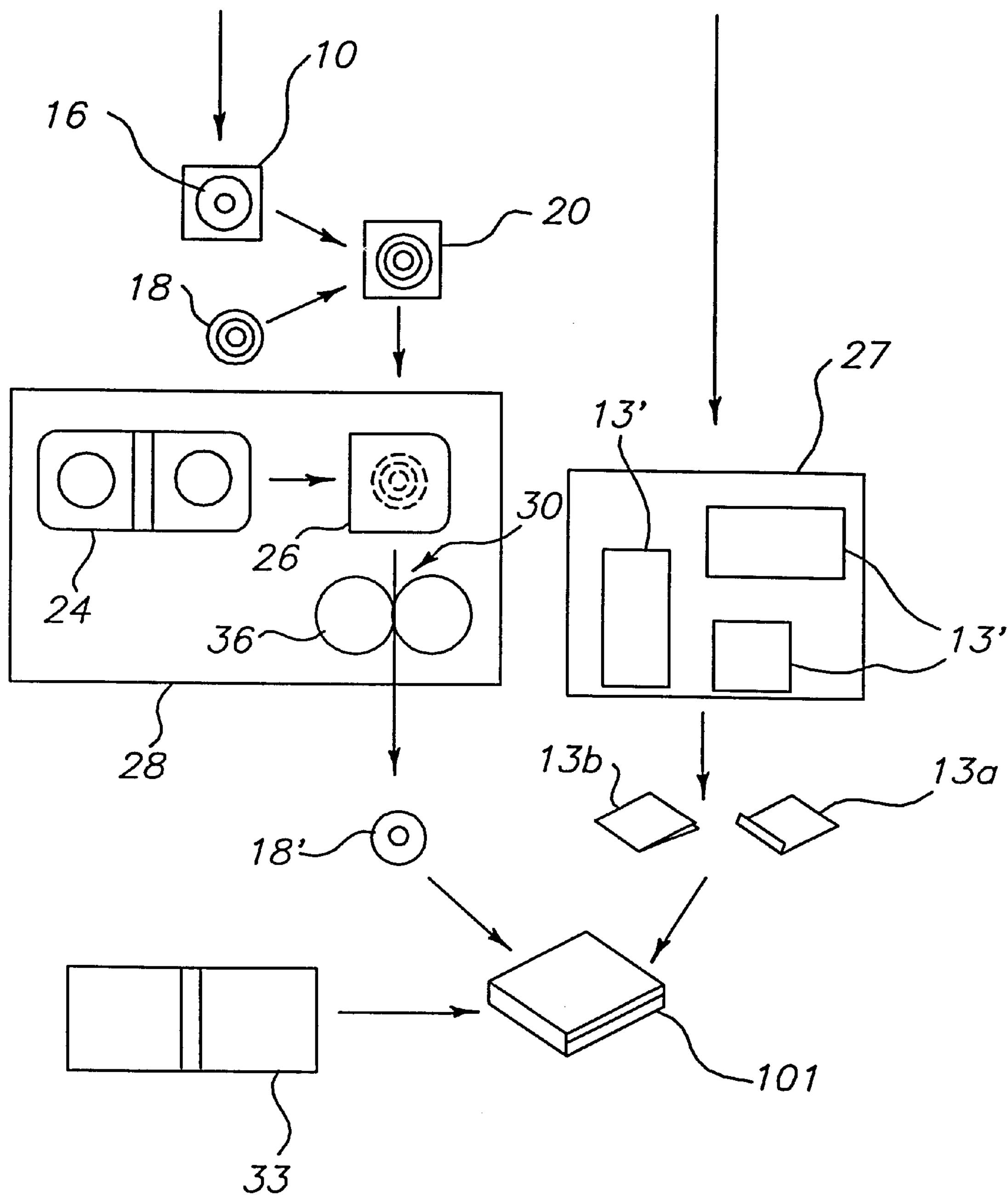
FIG. 5 is a diagrammatical view of part II of the printing procedures of the method of FIGS. 1–2.

Referring now to FIG. 5, the literature portion 13 is configured, as required for a particular use, by a literature configuration system, indicated diagrammatically in FIG. 5 by box 27. If the literature portion 13 has been divided into two or more separate pieces 13', then those pieces can be collated or otherwise ordered as necessary. This is illustrated diagrammatically in FIG. 7, which shows pieces 13' dropping into a slanted tray 29 having a stop 31. Other equipment for collating and organizing pieces of electrophotographic media are well known to those skilled in the art. The piece or pieces 13' of the literature portion can be folded or shaped either individually or as a collated stack. FIGS. 4–5 show a literature portion 13 cut into three pieces. One of the pieces 13' is then folded to form a backplate **13*a* for a jewel box 33. Two of the pieces 13' are collated and folded to form an insert booklet 13*b*. If an insert booklet 13*b* is made from multiple pieces 13'**, then it is generally desirable, prior to folding, to fasten the pieces of the unfinished booklet together by saddle stitching, stapling or the like.

Figure 8:
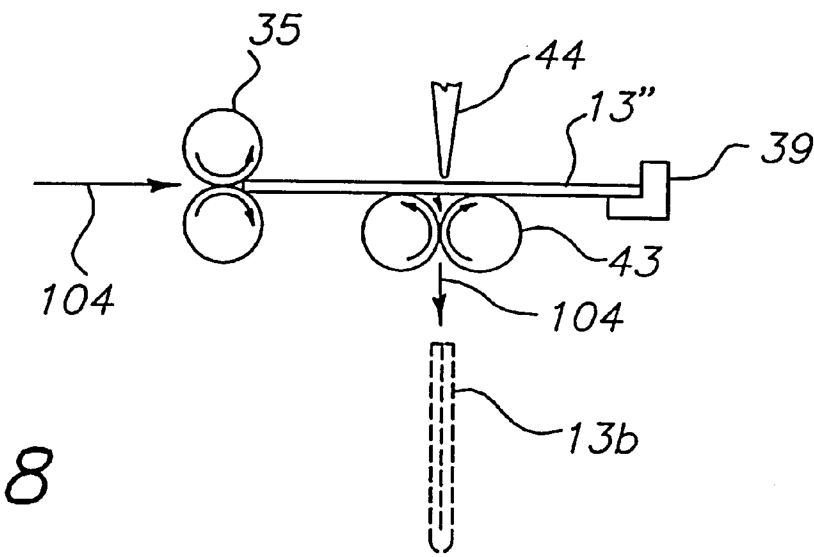
FIG. 8 is a diagrammatical view of an optional folding step of the procedures of FIGS. 4–5.
Figure 9:
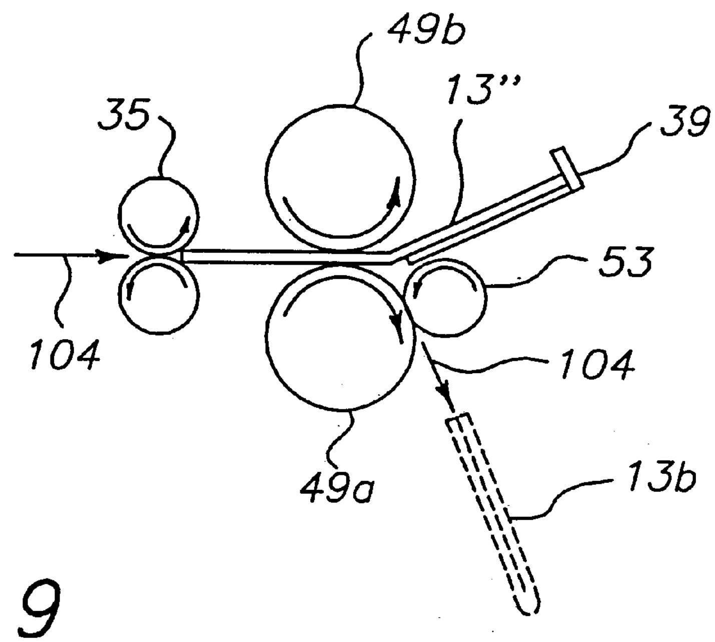
FIG. 9 is a diagrammatical view of an alternative optional folding step of the procedures of FIGS. 4–5.

A pair of alternative folding procedures are illustrated in FIGS. 8 and 9. Referring now to FIG. 8, arrows 104 indicate the direction of travel of the pieces 13. A pair of oppositely rotating rollers 35 drives an unfinished booklet 13" through a nip 37 and against an end stop 39. A knife edge 41 then descends and drives the center of the unfinished booklet 13" into the nip 37 of a second pair of oppositely rotating rollers 43 where the unfinished booklet 13" is folded to form an insert booklet 13*b*. The second pair of rollers 43 then discharges the booklet 13*b*. Referring to FIG. 9, a pair of oppositely rotating rollers 35 drives an unfinished booklet 13" through a first nip 45, then through a second nip 47 between a pair of high friction rollers 49*a*,49*b* until the unfinished booklet 13" encounters a stop 39. The high friction rollers 49*a*,49*b* then force the unfinished booklet 13" into the nip 51 formed by one of high friction rollers 49*a* and a final counter-rotating roller 53. The resulting folded booklet 13*b* is then discharged.

Figure 10:
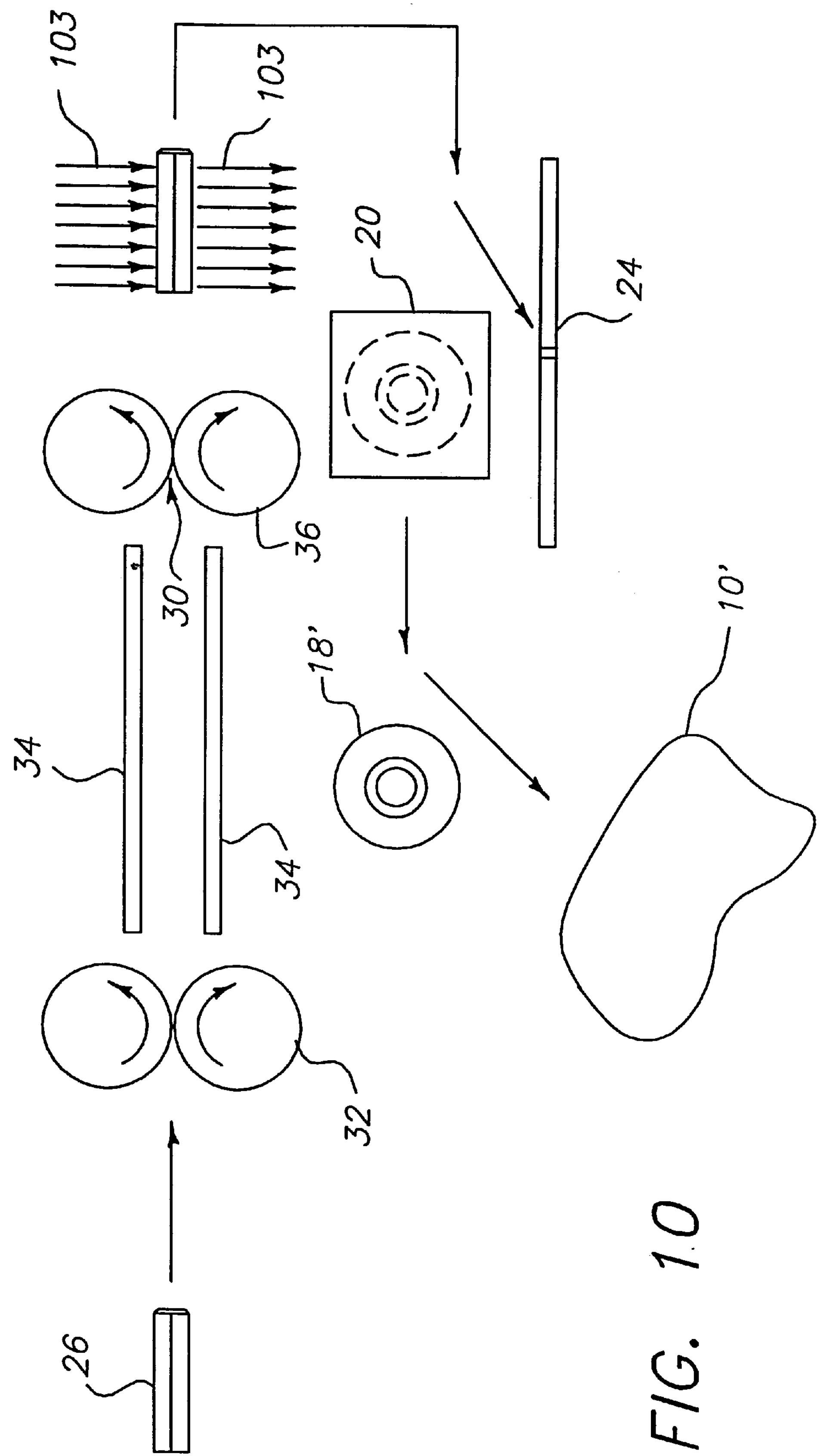
FIG. 10 is a diagrammatical view of details of the fusing procedure of the procedures of FIGS. 4–5.

Referring again to FIG. 5, the separated transfer portion 10 is placed in registration with the receiving surface of a digital disc 18 and the transferable toner image 16 is then fused to the juxtaposed face 22 of the digital disc 18, within a fusing system, indicated diagrammatically in FIG. 5 by box 28. FIG. 10 illustrates fusing using a lamination jacket and a roller fuser (details of this procedure are discussed below); however, this illustration is diagrammatical and should be considered to be inclusive of other fusers and fusing methods known to those of skill in the art. Registration can be provided by any of a variety of registration features, structures that limit relative movement of the transfer portion 10 and digital disc 18 during fusing. In a simple example, the transfer portion 10 can be cut into a circle of the same diameter as the digital disc 18 and can then be fused in a die or appliance having a cylindrical recess sized to closely receive the digital disc 18 and transfer portion 10.

Fusing can be provided by heat, or pressure or a combination of the two. Fusing can be accomplished by pressing the transfer portion 10 and digital disc 18 together in a heated die (not shown) configured to hold the transfer portion 10 and digital disc 18 in registration. An alternative procedure is roller laminating. The term "roller laminating" and similar terms are used herein to refer to procedures in which pressure is applied by moving an object through the nip between a pair of rollers or through other structures that apply heat and pressure in a similar manner. For example, an object can be roller laminated by supporting the object on a flat plate and rocking a curved heated platen over the object. As a matter of convenience, the term "rollers" is used generally herein to refer to both actual rollers and other roller lamination components. In roller laminating it is highly preferred that the fuser be compliant, that is, that the nip 30 be subject to enlargement by the passage of the transfer portion-digital disc pair 20. The transfer portion 10 and digital disc 18 are in registry during fusing. The transfer portion 10 and digital disc 18 can be fed through the nip 30 without an appliance or holder; however, it is currently preferred that the transfer portion 10 and digital disc 18 be placed in a lamination jacket 24 during fusing.

Currently preferred fusing procedures are illustrated in FIG. 10. The transfer portion 10 and digital disc 18 are both placed within the lamination jacket 24 (also shown in FIGS. 11–13). The transfer portion 10 and digital disc 18 are in registration and the transferable image 16 is juxtaposed against the face 22 of the digital disc 18. The transferable image 16 is located on the transfer portion 10 such that, when the transfer portion 10 and digital disc 18 are in registry, then the transferable toner image 16 and digital disc 18 will also be registered. The registered transfer portion 10 and digital disc 18 are referred to collectively herein as a transfer portion-digital disc pair 20. The lamination jacket 24 maintains registration and protects the transfer portion-digital disc pair 20 during fusing.

The transferable toner image 16 is then fused to the juxtaposed face 22 of the digital disc 18. In fusing, the filled jacket 26 is roller laminated by being fed to a pair of feed rollers 32 and then between a pair of heated plates 34, and through the nip 30 between a pair of compliant fusing rollers 36.

Figure 15:
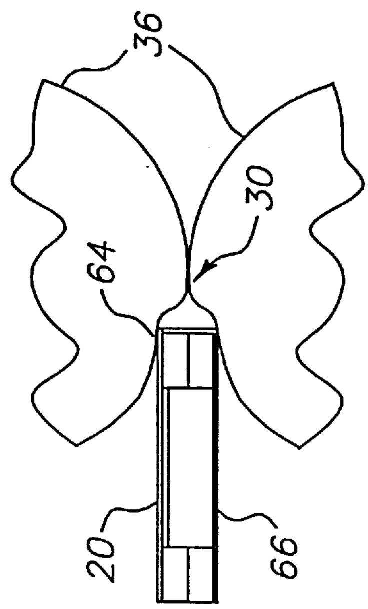
FIGS. 14–17 are semi-diagrammatical views of the fusing procedure of FIG. 9, in sequential order.
Figure 17:
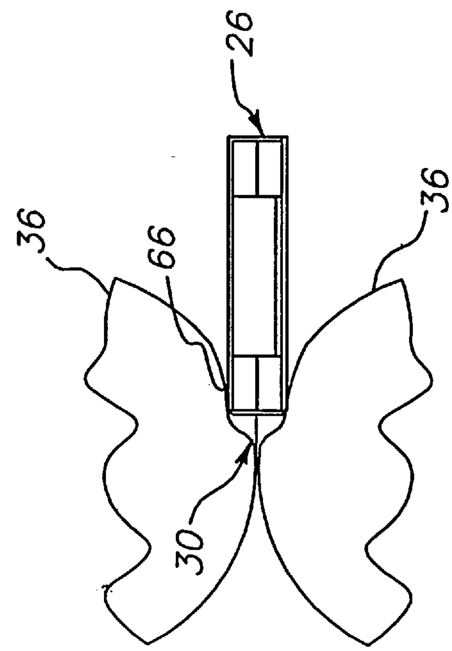
Figure 14:
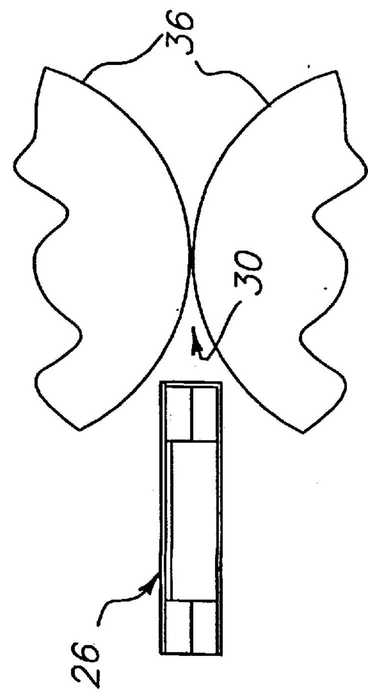
Figure 16:
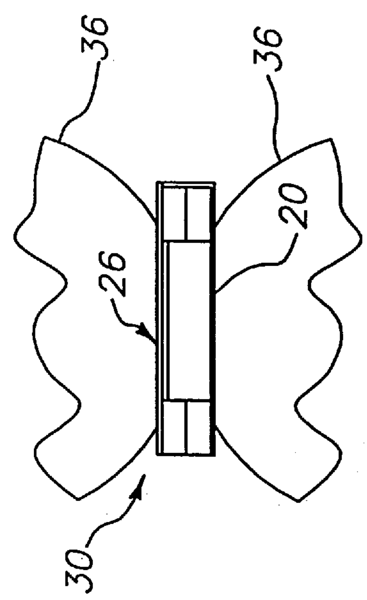

In this fuser, the nip 30 is indirectly heated. Rollers 36 can also be directly heated by internal heating elements (not shown) or the like. The lamination jacket 24, as discussed in detail below, not only keeps registration and generally protects the transfer portion 10 and digital disc 18, but also helps maintain a substantially uniform pressure on the transfer portion-digital disc pair 20 during the fusing step. The lamination jacket 24 does so, by enlarging the nip 30, that is, deflecting the compliant rollers 36 outward from the nip 30, before the transfer portion-digital disc pair 20 enters and after the transfer portion-digital disc pair 20 exits. The resulting constant nip size, for the transfer portion-digital disc pair 20, provides the substantially uniform pressure. The deflection of compliant fusing rollers 36 and enlargement of nip 30 is shown in FIGS. 14–17. In FIG. 14, the filled jacket 26 is fed into the nip 30. In FIG. 15, the leading drift 64 causes full deflection of nip 30 prior to entry of the transfer portion-digital disc pair 20 into nip 30. In FIG. 16, the transfer portion-digital disc pair 20 passes through the fully deflected nip 30. In FIG. 17, the nip 30 is held fully deflected by trailing drift 66, until transfer portion-digital.disc pair 20 has completely exited the nip 30. Drifts 64,66 are discussed in detail below.

A suitable lamination jacket 24 is shown in FIGS. 11–13. The lamination jacket 24 has a shell 38 which defines a pocket 40 for closely receiving the transfer support 10 and the digital disc 18. The shell 38 has opposed upper and lower flaps 42,44. The flaps 42,44 have front and rear flap margins 46,48 defining an axis of travel (indicated by arrow 50) of the lamination jacket 24 through the fuser 28. The flaps 42,44 are movable relative to each other between an open or separated configuration 52 in which the flaps 42,44 are spaced apart and a closed or juxtaposed configuration 54 in which the flaps 42,44 are overlapped. The flaps 42,44 are preferably joined together by a hinge 56.

The pocket 40 has a depth dimension, indicated by arrow 58, substantially perpendicular to the axis of travel and length and width dimensions substantially aligned with the larger dimensions of the flaps 42,44. The pocket 40 can be formed as a result of compliance of the flaps 42,44 about an interleaved transfer support 10 and digital disc 18. It is preferred, however, that the pocket 40 defined by the flaps 42,44 be further defined by an insert 60 disposed interior to the shell 38. The shell 38 and insert 60 can be made from a single unitary structure; however, the shell 38 and insert 60 can be discrete structures permanently adhered together.

The insert 60 can have a collar 62, a leading drift or leading edge section 64, a trailing drift or trailing edge section 66. The drifts 64,66 are forward and rearward of the collar 62, respectively. The collar 62 adjoins the pocket 40 and extends from the leading drift 64 to the trailing drift 66. The insert 60 can be a unitary structure or can comprise several pieces. The collar 62 can be deleted such that the insert 60 consists of leading and trailing drifts 64,66. The insert 60 can be limited to a single drift 64 or 66.

The materials used for the lamination jacket 24 must be sufficiently compliant such that pressure imposed on the shell 38 is substantially transferred to the transfer support-digital disc pair 20. On the other hand, it is undesirable for the lamination jacket 24, and in particular the shell 38, to be so limp that the flaps 42,44 readily assume a plurality of closed configurations. It is instead highly preferred that the materials used for the lamination jacket 24 are sufficiently stiff that the hinge 56 biases the flaps 42,44 against assuming configurations in which the flaps 42,44 are skewed relative to each other.

The shell 38 and insert 60 can be made as a single unitary structure or can take the form of separate components joined together. The shell 38 and insert 60 can also be partially unitary. For example, the insert 60 and part of the shell, such as an inner layer, can form a unitary structure having one or more additional shell layers adhered over the outside.

The lamination jacket 24 can be made from low cost materials such as papers and plastic films; however, the lamination jacket 24 must be configured to alleviate any undesirable characteristics of materials used. For example, it is highly desirable that the lamination jacket 24 not offset onto the fuser 28 during use and that moisture be excluded from the transfer support-digital disc pair 20 during fusing. Some plastics readily offset at fusing temperatures and pressures. Papers have high moisture contents.

An example of a lamination jacket 24 that overcomes these shortcomings is shown in FIGS. 8–10. The shell 38 has two layers 68,70. A non-offset layer 68 of paper is disposed on the outside. A moisture barrier layer 70 of plastic film is disposed on the inside between the non-offset layer 68 and the insert 60. Suitable materials for the moisture barrier layer 70 include polyester and polypropylene. The insert 60 is a moderately stiff, heavy stock paper like bristol board. A variety of other materials could also be used for the layers 68,70, taking into consideration the conditions encountered within the nip 30. For example, the glass transition temperature of polymers used should not be below the temperatures encountered in the nip.

Referring again to FIGS. 11–13, when the lamination jacket 24 is in closed configuration 54, the digital disc 18 contacts the insert 60 only along the circumference of the disc 18. The bottom 72 of the disc 18 contacts the moisture barrier layer 70 of the shell 38. The face 22 of the disc 18 contacts the transfer support 10, which also mostly contacts the shell 38 rather than the insert 60. The result is that the moisture barrier layer 70 substantially moisture-proofs the transferable image 16 and digital disc 18 relative to the paper insert 60 during fusing. The non-offset layer 68 protects the moisture barrier layer 70 from the fuser 28 so that the shell 38 is substantially free from offset at a temperature and pressure sufficient to fuse the transferable image 16 to the digital disc 18.

The shell 38 is preferably configured to extend over the entire bottom of the digital disc 18 and the backside of the transfer support 10 to substantially isolate the transferable image 16 and digital disc 18 from the fuser 28 and protect against scuffing or other mechanical injury during transport. Referring now to FIGS. **12*a*–12*b*, extreme corners of the lamination jacket 24 can be left as sharp points or can be radiused or the like, as desired. If the transferable image 16 is rectangular, then radiused corners can provide a visual reference as to whether a transfer support 10 has been placed within the lamination jacket 24**.

The leading drift 64 adjoins the front flap margin 46. The trailing drift 66 adjoins the rear flap margin 48. The drifts 64,66 are each transverse to the axis of travel 50 and tangential or substantially tangential to the pocket 40. In the embodiment of the lamination jacket 24 of FIGS. 11–13, the drifts 64,66 each have substantially the same width dimension as the pocket 40 in a direction substantially perpendicular to the axis of travel 50. Drifts 64,66 having a width-wise extension that is less than that of the pocket 40 are not considered optimal. Extension of drifts 64,66 substantially beyond the pocket 40 in the directions of the width dimension is not considered critical, but can be provided as a matter of design convenience.

During fusing the drifts 64,66 force resilient expansion of the nip 30 forward of the transfer support-digital disc pair 20 and allow resilient contraction of the nip 30 rearward of the transfer support-digital disc pair 20. This provides a substantially uniform area within the nip 30 during fusing of the toner image, so as to minimize non-uniformities in the pressure applied by the compliant rollers to the face 22 of the disc 18. When the lamination jacket 24 passes between the compliant rollers 36, the nip 30 expands and contracts in spaced relation to the pocket 40 and maintains a substantially constant dimension as the pocket 40 passes through the nip 30. Non-uniform pressure or areas of excess pressure, are apparently due to less area within the nip 30, and were determined to be related to localized smearing of the toner image.

It is currently preferred that the drifts 64,66 expand the nip 30 to the same extent as the transfer support-digital disc pair 20. This can be provided by a lamination jacket 24, that is made of relatively incompressible materials and that, at least when filled, has a constant thickness. The lamination jacket 24 of FIGS. 2–4 and 7 meet this provision. The drifts 64,66 each have a constant thickness that is substantially the same as the depth of the pocket 40 and the thickness of the transfer support-digital disc pair 20. Since the transfer support 10 is ordinarily thin, the thickness of the drifts 64,66 is also substantially the same as the thickness of the digital disc 18. For example, 50 mils is a suitable thickness for drifts 64,66 for use with a commonly used variety of digital disc 18 having a standardized thickness of 50 mils.

In the embodiment of the lamination jacket of FIGS. 11–13, the collar 62 and drifts 64,66 each have an upper subunit 74,76,78, respectively, and a lower subunit 80,82,84, respectively. The upper subunits 74,76,78 together define a unitary upper half-insert 86. The lower subunits 80,82,84 together define a unitary lower half-insert 88. The two half-inserts 86,88 together have substantially the same thickness as the digital disc 18, that is, a thickness that is substantially equal to the depth of the pocket 40. The upper half-insert 86 is joined to the upper flap 42. The lower half-insert 88 is joined to the lower flap 44. The half-inserts 86,88 are displaceable relative to each other between an open or spaced apart configuration and a closed or juxtaposed configuration. The half-inserts 86,88 each have a cut-out 90. The cut-outs 90 each have an inner end 92 and an outer end 94. The outer ends 94 of the cut-outs 90 are occluded by the shell 38. The inner ends 92 are substantially aligned when the half-inserts 86,88 are in the closed conformation, so that the cut-outs 90 together define continuous lateral boundaries for pocket 40, which is shaped like a short cylinder having a diameter only slightly larger than the diameter of the digital disc 18 and a depth that is substantially equal to the thickness of the digital disc 18. It is convenient if each half-insert 86,88 has a uniform thickness equal to about half the thickness of the digital disc 18.

The lamination jacket 24 includes transfer support and digital disc guides 96,98 for registering the transfer support 10 and digital disc 18 within the pocket 40. The transfer support 10 and digital disc 18 are both registered relative to the lamination jacket 24, and thus registered relative to each other. With the lamination jacket 24 in the open configuration 52, the guides 96,98 aid in the placement of the transfer support 10 and digital disc 18 within the lamination jacket 24, by inhibiting lateral movement once the digital disc 18 or transfer support 10 has attained a registration position. With the lamination jacket 24 in closed configuration 54, the guides 96,98 help inhibit relative movement of the transfer support 10 and digital disc 18 during fusing. The guides 96,98 adjoin one or both flaps 42,44.

The guides 96,98 can provide registration in one or two dimensions. Movement of the transfer support-digital disc pair 20 in a first dimension parallel to the central axis 100 of the digital disc 18 is constrained by the overall configuration of the lamination jacket 24 and by the fuser 28. The guides 96,98 constrain movement in one or both of the two dimensions, referred to herein as "length" and "width", perpendicular to the central axis 100 of the digital disc 18. It is preferred that guides 96,98 constrain movement of the transfer support 10 and digital disc 18 in length and width dimensions.

A convenient configuration for the digital disc guide 98 that provides length and width registration is a continuous or discontinuous ring that closely fits with a complementary structure on the digital disc 18. If the ring is discontinuous, it preferably has three or more contact points spaced so as to limit disc movement in length and width dimensions. The digital disc guide 98 can closely fit the outer edge of the digital disc 18 or a complementary structure on the digital disc 18, for example, an annular indentation near the inner margin. In the lamination jacket shown in FIGS. 11–13, the digital disc guide 98 is a portion of the rim of the pocket 40.

The configuration of the transfer support guide 96 depends upon the configuration of the transfer support 10. For example, if the transfer support 10 is circular in outline and about the same diameter as the digital disc 18, then the transfer support guide 96 is a portion of the rim of the pocket 40. If the transfer support 10 is rectangular or square in outline, then the transfer support guide 96 can be appropriately located tabs or edges protruding from the insert 60 or shell 38. The lamination jacket 24 shown in FIGS. 11–13, can utilize both disc-shaped and rectangular transfer supports. The rim of cut-outs 90 has an upper portion that defines guide 96*a*, which can engage disc-shaped transfer supports, and a lower portion that defines guide 98, which can engage discs.

Tolerances for the guides 96,98 are determined by acceptable tolerances for the position of the image on the completed disc. Ordinarily, rotation of the position of the transferable image 16 about the axis 100 of the disc 18 is inconsequential. Thus the primary tolerance at issue for locating the transferable image 16 on the digital disc 18 is the radial offset of the center of the image from the axis 100 of the digital disc 18. An example of a suitable tolerance is 1 millimeter in radial offset.

With transfer portions 10 having a circular or other radially symmetrical outline, alignment of the transfer portion 10 and digital disc 18 about a common center can be easily established solely by use of appropriately sized guides 96,98. With rectangular transfer portions 10 or transfer portions 10 having a non-centered transferable image 16 or the like, it may be convenient to provide one or more visible indicators (not shown) as registration aids on the transfer portion 10, and, if desired, on the lamination jacket 24. For example, the transfer portion 10 and lamination jacket 24 can include matching arrows or other visible indicators to aid an operator in properly orienting the transfer portion 10 relative to the lamination jacket 24. A visible indicator can be located in a "waste" section of the transfer portion 10.

In use, referring to FIGS. 11–13, the lamination jacket 24 is opened, a digital disc 18 is placed in one of the cut-outs 90, a circular transfer portion 10 is placed in the other cut-out, and the jacket is closed to superimpose the two cut-outs 90.

The lamination jacket 24 is heat and pressure roller laminated, for example, by the procedure illustrated in FIG. 10. The filled jacket 24 including the transfer portion 10 and digital disc 18 is transported by drive rollers 32 through a heating zone 34 to a set of compliant rollers 36. The lamination jacket 26 is then rolled hot by compliant rollers 36 to fuse the transferable toner image 16 to the digital disc 18.

After fusing, the filled jacket 26 is cooled, indicated diagrammatically in FIG. 10 by arrows 103, and is then opened and the fused transfer portion-digital disc pair 20 is removed from the lamination jacket 24. The used transfer portion 10' is stripped off, resulting in the completed digital disc 18' bearing a fused toner image (not indicated in figure). The used transfer portion 10' and lamination jacket 24 can be discarded or, if undamaged, can be reused.

The completed digital disc and accompanying literature are then assembled along with any other necessary packaging. This is illustrated in FIG. 5 for an information package including a digital disc 18, a jewel box 33, a backplate 13*a,* and an insert booklet 13*b*. Collection of the different components and assembly into the final product can be accomplished by hand by automated equipment like that currently used to package digital discs and accompanying literature in jewel boxes.

Referring again to FIGS. 1–2*a,* the problem faced by the invention is that whether the information package is assembled manually or by machine, there is a need to associate a particular disc with particular literature. It is critical that the printed image on the disc correspond with the digital information on the disc. Coordination could be provided by running literature preparation and disc preparation procedures in tandem. Appropriate waiting times could be added, for example, to slow the printer to match the speed of the writer. This has a number of shortcomings. To reduce the risk of mismatching, any process interruption would call for the destruction of existing uncompleted product. Preparation times would be slowed to the pace of the slowest component.

In the method of the invention this problem is resolved by the use of matching identification markings 156,158 on the digital disc 151 or 151' and the printed media 153', respectively. In currently preferred embodiments of the invention, the identification markings include machine readable and human readable identification information; however, the identification markings could be limited to human or machine readable information, if desired. The markings on different components "match", but are not necessarily the same on each component. For example, machine readable identification markings can be used that differ until one of the markings is subjected to a conversion algorithm.

The identification markings can be limited to the printed media; that is, the identification markings can be printed on the disc and literature by the printer. This provides easy association of the disc and literature after labeling, but does not allow for association of an unlabelled disc and printed literature. In a currently preferred embodiment of the invention, the identification markings are present on the digital disc in a form that is resistant to alteration and are also printed on the printed media including one or more items of literature. This allows accurate and easy association of disc and literature at all times during preparation. The alteration resistant marking on or in the material of the digital disc is also referred to herein as an "embedded" marking and the process of imparting it is also referred to as "embedding".

The identification marking is provided to the apparatus of the invention, either by a source external to the digital disc or by the digital disc itself.

The identification marking can be provided by a variety of sources external to the disc. For example, the identification marking can be provided in digital form as part of the package file group for a particular information package selection. Alternatively, the identification marking can be provided by an identification marking generator either within or in communication with the apparatus of the invention. The identification marking generator can either exist as a virtual device or as a discrete physical device.

Figure 2B:
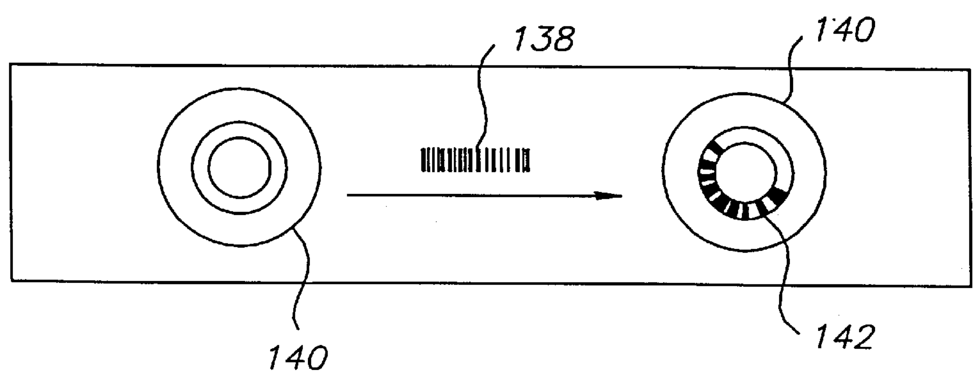
FIG. 2*b* is a diagrammatical view of an optional procedure in the method of FIGS. 1 and 2*a* in which a digital disc is marked with an identification marking.
Figure 3:
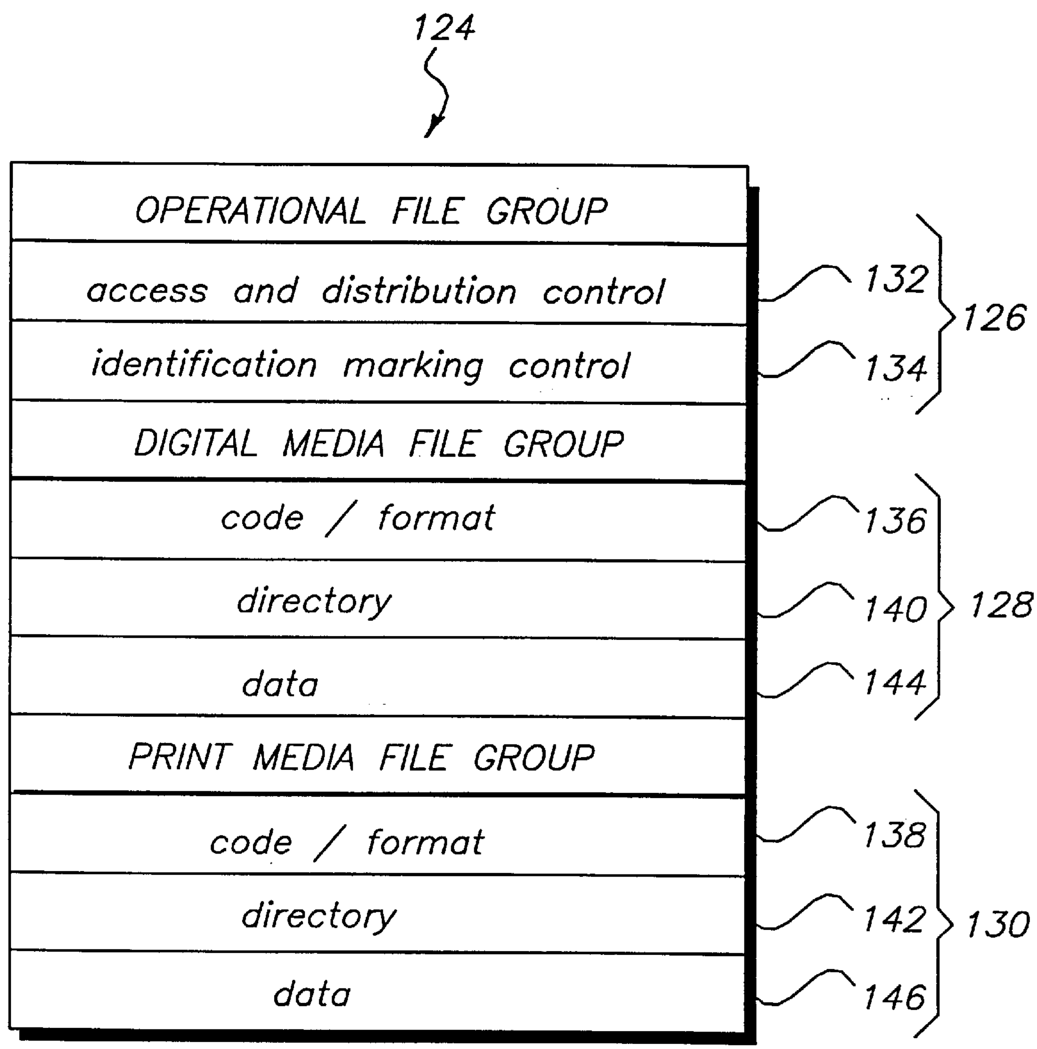
FIG. 3 is a diagrammatical view of the package file group of the method and apparatus of FIGS. 1–2.

Referring now to FIG. 2*b,* if the identification marking is provided by an external source and it is desired to provide the identification marking 156 directly on the digital disc 151, then the identification marking 156 is added to the digital disc 151 as a part of the method of the invention. (Prior to marking, the digital media might bear incidental marking indicia, but would be free of identification markings, as the term is used herein.) The identification marking 156 can be added to the disc 151 by a marking engine that embeds the identification marking in the material of the digital media. Examples of suitable marking engines and related techniques are discussed in U.S. Pat. No. 4,961, 077. In the embedding procedure, the marker engine carbonizes or otherwise disrupts a region of the material of the disc. The disrupted area or the entire disc is then covered with an overcoat of protective lacquer. The disrupted area can extend uniformly over the full scope of the identification marking or alternatively can be formed from a combination of discrete dots in the manner of a gray scale printed image.

Referring to FIGS. 1–2*a,* it is preferred that the source of the identification marking 138 is the digital disc 151 itself. The identification marking 138 can be supplied as a unique digital representation recorded on the media or as an embedded marking in or on the digital media or as both. The term "digital representation of the identification marking" is used to refer to information which allows for matching with a printed identification marking. This can be a direct digitization of the identification marking or an encoded form of such information or a recognition key or the like.

The embedded identification marking can be imparted to the digital discs in a manner similar to that above-described, but independent of the method of the invention and prior to the inclusion of the discs in the store of apparatus. A specific example of digital discs having embedded identification markings are writable compact discs marketed by Eastman Kodak Company of Rochester, N.Y., under the designation: "Writable Compact Discs with Infoguard Protection™". These digital discs have a 12 or 16 digit media bar code and human readable identification number disposed, in an arc of constant radius about the hub of the digital disc.

Whether the information marking is supplied on the digital media or applied by the apparatus, it is desirable that the completed information package include a digital disc that has an embedded identification marking and a written digital representation of the digital marking within the digital information present on the disc; since the two markings can be utilized for security protection.

The source provides the identification marking to the apparatus of the invention by means of an interface. The nature of the interface necessarily depends upon the nature of the source. For example, in a preferred embodiment of the invention, the source is a bar code embedded in the digital disc and the interface is a bar code reader. The bar code reader reads the identification marking on the digital disc and then provides, for further processing, a digital representation corresponding to the identification marking. (This is represented in FIG. 1 by element 124', a digital file group that includes the digital representation of the identification marking 160.)

The apparatus of the invention includes a controller (not shown) that receives a signal that identifies a user demand for a package file group in the catalog, retrieves a package file group corresponding to that signal; allocates the identification marking to the digital file group; allocates digital and print media to the digital file group to provide allocated digital and print media (represented by bar 172 in FIG. 1); transfers to the writer the information necessary to write the digital media data file groups to the allocated digital media; transfers to the printer the information necessary to print the print media data file groups on the allocated print media. In particular embodiments of the invention, the controller also transfers to the marker engine information necessary to embed the identification marking on the allocated digital media. Along with other components described above, the controller can take the form of an appropriately configured microcomputer. Further details of such a microcomputer will be apparent from the following description of an embodiment of the method of the invention and related figures.

Referring now to FIGS. 1–2, a catalog of information packages is displayed for the user. Upon selecting a particular information package, the user can take an appropriate action, such as pressing a designated key or portion of a touch screen display. This causes an input signal to be generated that corresponds to the information package selection. This signal is received by the controller, which in response provides a digital file group for the information package selection. The digital file group includes information necessary to write the first body of information to digital media and information necessary to print the second body of information to print media. The identification marking is allocated to the digital file group. The digital media and print media are allocated to the digital file group. The identification marking is printed on the digital media. The first body of information and a digital representation of the identification marking is written on the digital media. The identification marking is printed on the print media. The second body of information is printed on the print media. The printed and written media bearing the same identification marking are then sorted together.

PARTS LIST apparatus 110
display 112
indicia 114
signal generator 116
arrow 120
file store 122
package file group 124
operational group 126
digital media file group 128
print media file group 130
distribution control file group 132
identification marking file group 134
format file group 136,138
directory file group 140,142
datafile group 144,146
store 150
digital media 151
store 152
print media 153
image 162
partial transfer sheet 11
literature portion 13
transfer portion 10
transferable image 16
electrophotographic printer 12
support layer 17
transfer layer 19
receiving surface 21
lower surface 23
punch 25
box 27
slanted tray 29
stop 31
jewel box 33
booklet 13*b* arrows 104
rollers 35
nip 37
end stop 39
knife edge 41
rollers 43
nip 47
high friction rollers **49*a*,49*b***
stop 39
counter-rotating roller 53
digital disc 18
face 22
nip 30
transfer portion-digital disc pair 20
lamination jacket 24
filled jacket 26
heated plates 34
fusing rollers 36
drift 64 and 66
pocket 40
lower flaps 42,44
rear flap margins 46,48
lamination jacket 24
fuser 28
hinge 56
arrow 58
shell 38
insert 60
collar 62
non-offset layer 68
barrier layer 70
configuration 54
bottom 72
face 22
front flap margin 46
upper subunit 74,76,78
lower subunit 80,82,84
upper half-insert 86
lower half-insert 86,88
cut-out 90
outer end 94
inner ends 92
digital disc guides 96,98
digital disc 18
pocket 40

What is claimed is:

1. Method for preparing, on user demand, a selection from a catalog of information packages, the selection including a first body of information to be recorded on digital media and a second body of information for printing on print media the method comprising the steps of:

providing the catalog of information packages;

receiving an input signal corresponding to the information package selection;

providing a digital file group for the information package selection, the digital file group including information necessary to write the first body of information to digital media and information necessary to print the second body of information to print media, and providing an identification marking for the information package selection;

recording the first body of information and a digital representation of the identification marking on the digital media;

printing the identification marking on the digital media and printing the identification marking and the second body of information on the print media; and for each information package selection correlating the digital medium and the print medium according to the identification marking.

2. The method of claim 1 wherein the correlating step further comprises detecting the identification markings on the media bearing the identification markings.

3. The method of claim 1 wherein the identification markings are in an optical bar code format.

4. The method of claim 1 wherein the digital media are recordable optical disc, and the step of printing the identification marking on the digital media further comprises printing optical bar code characters along an arc of constant radius of the disc.

5. The method of claim 1 wherein the step of printing the identification marking on the digital media further comprises physically embedding the identification marking within the digital media.

6. Apparatus for preparing, on user demand, a selection from a catalog of information packages, the selection including a first body of information to be recorded on digital media and a second body of information for printing on print media comprising:

a display for presenting a selected individual information package from the catalog of information packages;

a signal generator having an input panel for receiving input, selecting an information package and producing a signal identifying the information package selection;

a digital file store for the information package selection, the digital file store including information necessary to write the first body of information to digital media and information necessary to print the second body of information to print media, and providing an identification marking for the information package selection;

a printer for printing the identification marking on the digital media;

a digital recorder for recording the first body of information and a digital representation of the identification marking on the digital media;

printing means for printing the identification marking and the second body of information on the print media and for printing the identification marking on the digital media; and a controller including:

means for providing the identification marking to the digital file store;

means for transferring to the printing means, information necessary to print the identification marking;

means for transferring to the digital recorder, the information necessary to record the first body of information to the digital media; and whereby for each information package selection there is a correlation of a digital medium and a print medium according to the identification marking.

7. A digital medium and a corresponding print medium correlated with the digital medium comprising:

the digital medium including a first body of information and a identification marking printed on the digital medium; and the print medium including the identification marking and a second body of information printed on the print medium so that the identification marking correlates the digital medium with its corresponding print medium.

* * * * *